United States Patent
Wang et al.

(10) Patent No.: US 11,277,343 B2
(45) Date of Patent: Mar. 15, 2022

(54) USING VTI TEAMING TO ACHIEVE LOAD BALANCE AND REDUNDANCY

(71) Applicant: VMware, Inc., Palo Alto, CA (US)

(72) Inventors: Yong Wang, San Jose, CA (US); Jia Yu, San Jose, CA (US); David Leroy, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 134 days.

(21) Appl. No.: 16/514,647

(22) Filed: Jul. 17, 2019

(65) Prior Publication Data

US 2021/0021523 A1 Jan. 21, 2021

(51) Int. Cl.
*H04L 12/803* (2013.01)
*H04L 29/06* (2006.01)
*H04L 47/125* (2022.01)

(52) U.S. Cl.
CPC ........ *H04L 47/125* (2013.01); *H04L 63/0272* (2013.01); *H04L 63/164* (2013.01)

(58) Field of Classification Search
CPC ... H04L 47/125; H04L 63/0272; H04L 63/16; H04L 63/164
See application file for complete search history.

(56) References Cited

U.S. PATENT DOCUMENTS

| | | |
|---|---|---|
| 6,901,452 B1 | 5/2005 | Bertagna |
| 6,968,441 B1 | 11/2005 | Schnee |
| 7,003,118 B1 | 2/2006 | Yang et al. |
| 7,181,612 B1 | 2/2007 | Pellacuru et al. |
| 7,555,544 B1 | 6/2009 | Rattner et al. |
| 7,962,358 B1 | 6/2011 | Fernandez et al. |
| 8,175,078 B2 | 5/2012 | Voit et al. |
| 8,356,346 B2 | 1/2013 | Datta et al. |

(Continued)

FOREIGN PATENT DOCUMENTS

CN 108540559 A 9/2018

OTHER PUBLICATIONS

Internet-Computer-Security.com, "VPN Setup Tutorial Guide", http://www.internet-computer-security.com/VPN-Guide/VPN-Tutorial-G, last viewed on May 1, 2019, 7 pages.

(Continued)

*Primary Examiner* — Michael Thier
*Assistant Examiner* — Prince A Mensah

(57) ABSTRACT

In an embodiment, a computer-implemented method for using virtual tunnel interface teaming to achieve load balance and redundancy in virtual private networks ("VPNs") is disclosed. In an embodiment, a method comprises: receiving, by a gateway, configuration data from a control plane; based on the configuration data, configuring on the gateway a bonded virtual tunnel interface ("bonded VTI") having a plurality of slave virtual tunnel interfaces ("slave VTIs"); configuring a plurality of VPN tunnels between the plurality of slave VTIs configured on the gateway and a plurality of slave VTIs configured on a remote gateway; configuring an IPsec VPN tunnel between the bonded VTI configured on the gateway and a corresponding bonded VTI configured on the remote gateway; logically combining the plurality of VPN tunnels into the IPsec VPN tunnel; and enabling communications of IPsec VPN traffic via the IPsec VPN tunnel.

20 Claims, 4 Drawing Sheets

(56) References Cited

U.S. PATENT DOCUMENTS

| | | | |
|---|---|---|---|
| 8,547,837 | B2 | 10/2013 | Ronciak et al. |
| 9,483,286 | B2 | 11/2016 | Basavaiah et al. |
| 9,535,750 | B1 | 1/2017 | Wilkes et al. |
| 9,588,813 | B1 | 3/2017 | Dubey et al. |
| 9,674,088 | B1 | 6/2017 | Sivaramakrishnan et al. |
| 9,712,460 | B1 | 7/2017 | Friend |
| 9,929,970 | B1 | 3/2018 | Matthews et al. |
| 10,020,984 | B1 | 7/2018 | Jork et al. |
| 10,257,167 | B1 | 4/2019 | Matthews et al. |
| 10,498,708 | B2 | 12/2019 | Wang et al. |
| 10,623,372 | B2 | 4/2020 | Wang et al. |
| 10,701,107 | B2 | 6/2020 | Gopal et al. |
| 2002/0097724 | A1 | 7/2002 | Halme et al. |
| 2003/0088787 | A1 | 5/2003 | Egevang |
| 2004/0225895 | A1 | 11/2004 | Mukherjee et al. |
| 2006/0002388 | A1 | 1/2006 | Grebus et al. |
| 2007/0130352 | A1 | 6/2007 | Chhabra et al. |
| 2008/0123593 | A1 | 5/2008 | Fujita et al. |
| 2008/0144625 | A1 | 6/2008 | Wu et al. |
| 2008/0165964 | A1 | 7/2008 | Lewis et al. |
| 2008/0307024 | A1 | 12/2008 | Michaels et al. |
| 2009/0199290 | A1 | 8/2009 | McCullough et al. |
| 2009/0287848 | A1 | 11/2009 | Kamura et al. |
| 2010/0153715 | A1 | 6/2010 | Kauppinen et al. |
| 2010/0191958 | A1 | 7/2010 | Chen |
| 2010/0217949 | A1 | 8/2010 | Schopp et al. |
| 2011/0113236 | A1 | 5/2011 | Chenard et al. |
| 2012/0027314 | A1 | 2/2012 | Lee et al. |
| 2012/0102278 | A1 | 4/2012 | Joffray et al. |
| 2012/0124591 | A1 | 5/2012 | Cadambi et al. |
| 2012/0170459 | A1 | 7/2012 | Olesinski et al. |
| 2012/0254353 | A1 | 10/2012 | Baba et al. |
| 2013/0201989 | A1 | 8/2013 | Hu et al. |
| 2014/0089480 | A1 | 3/2014 | Zhu |
| 2014/0108665 | A1 | 4/2014 | Arora et al. |
| 2014/0313932 | A1 | 10/2014 | Saltsidis |
| 2015/0195138 | A1 | 7/2015 | Horman |
| 2015/0263974 | A1 | 9/2015 | Jain et al. |
| 2016/0057108 | A1 | 2/2016 | Hu |
| 2016/0085571 | A1 | 3/2016 | Kim et al. |
| 2016/0087888 | A1 | 3/2016 | Jain et al. |
| 2016/0088072 | A1 | 3/2016 | Likhtarov et al. |
| 2016/0092259 | A1 | 3/2016 | Mehta et al. |
| 2016/0212098 | A1 | 7/2016 | Roch |
| 2016/0226815 | A1 | 8/2016 | Wan et al. |
| 2016/0352628 | A1 | 12/2016 | Reddy et al. |
| 2017/0005931 | A1 | 1/2017 | Mehta et al. |
| 2017/0024293 | A1 | 1/2017 | Bell et al. |
| 2017/0054603 | A1 | 2/2017 | Kulkarni et al. |
| 2017/0063808 | A1 | 3/2017 | Manapragada et al. |
| 2017/0063979 | A1 | 3/2017 | Saeki |
| 2017/0374025 | A1 | 12/2017 | Pan |
| 2018/0054458 | A1 | 2/2018 | Marek et al. |
| 2018/0067786 | A1 | 3/2018 | Nguyen et al. |
| 2018/0069924 | A1 | 3/2018 | Tumuluru et al. |
| 2018/0123950 | A1 | 5/2018 | Garg et al. |
| 2018/0131521 | A1 | 5/2018 | Yang et al. |
| 2018/0191642 | A1 | 7/2018 | Biederman et al. |
| 2018/0343146 | A1 | 11/2018 | Dunbar et al. |
| 2019/0114206 | A1 | 4/2019 | Murugesan et al. |
| 2019/0140984 | A1 | 5/2019 | Agarwal et al. |
| 2019/0173841 | A1 | 6/2019 | Wang et al. |
| 2019/0173850 | A1 | 6/2019 | Jain et al. |
| 2019/0173851 | A1 | 6/2019 | Jain et al. |
| 2019/0173920 | A1 | 6/2019 | Gopal et al. |
| 2019/0190892 | A1 | 6/2019 | Menachem et al. |
| 2019/0215385 | A1* | 7/2019 | Ethier .................. H04L 69/324 |
| 2019/0266217 | A1 | 8/2019 | Arakawa et al. |
| 2020/0120078 | A1 | 4/2020 | Mao et al. |
| 2020/0267623 | A1* | 8/2020 | Altay .................. H04W 12/033 |
| 2020/0351254 | A1 | 11/2020 | Xiong et al. |
| 2020/0403922 | A1 | 12/2020 | Yu et al. |
| 2021/0021523 | A1 | 1/2021 | Wang et al. |
| 2021/0136049 | A1 | 5/2021 | Wang et al. |

OTHER PUBLICATIONS

"IPsec VPN Overview", info_outline Platform and Release Support, dated Mar. 31, 2019, 25 pages.

Chandrashekar, Shekhar et al., U.S. Appl. No. 16/906,905, filed Jun. 19, 2020, 126 pages.

Kumar, Raju et al., U.S. Appl. No. 16/016,360, filed Jun. 22, 2018, 36 pages.

Wang, Dexiang et al., U.S. Appl. No. 16/893,450, filed Jun. 5, 2020, 33 pages.

Non-Published U.S. Appl. No. 16/802,580, filed Feb. 27, 2020, 27 pages.

Receive Side Scaling (RSS) Guide by Microsoft https://docs.microsoft.com/en-US/windoes-hardware/drivers/network/ndis-receive-side-scaling2, Apr. 19, 2017, p. 3936 (Year: 2017).

Kaufmann, Antoine et al., High Performance Packet Processing with FlexNIC, ASPLOS '16 Apr. 2-6, 2016, Atlanta Georgia, USA, DOI: http://dx.doi.org/10.1145/2872362.2872367, 15 pages.

Son, Jeongseok et al., "Protego: Cloud-Scale Multitenant IPsec Gateway", USENIX Annual Technical Conference (2017), 15 pages.

Muramatsu S., et al., "VSE: Virtual Switch Extension for Adaptive CPU Core Assignment in Softirq", 2014 IEEE 6th International Conference on Cloud Computing Technology and Science, Singapore, 2014, 7 pages.

Ye, Y et al., "Maracas: A Real-Time Multicore VCPU Scheduling Framework", 2016 IEEE Real-Time Systems Symposium (RTSS), Porto, 2016, 12 pages.

Brouer, Jesper Dangaard, https://patchwork.ozlabs.org/project/netdev/cover/150814913767.1806 .3470498528707259987.stgit@firesoul/, Oct. 16, 2017, 3 pages.

Hopps C., Network Working Group entitled "Analysis of an Equal-cost Multi-Path Algorithm", dated Nov. 2000 (8 pages).

Cisco IOS XE Release 3S, MPLS: Layer 3 VPNs Configuration Guide entitled "ECMP Load Balancing", (Cisco ASR 900 Series), dated May 2018 (12 pages).

U.S. Appl. No. 17/016,596, filed Sep. 10, 2020, 36 pages, VMWare, Inc.

* cited by examiner

302 Based on Configuration Data Obtained from a Central Control Plane, a Gateway Configures a Bonded VTI having a Plurality of VTIs and Configures a Plurality of VPN Tunnels, each Tunnel Having Two Underlay VPN Addresses

304 For Dynamic Routing: Based on Configuration Data Obtained from the Central Control Plane, the Gateway Configures one BGP-over-IPsec Session and an IPsec VPN Tunnel with the IP addresses of the two Bonded VTIs

FIG. 3A

314 Based on a Hash Value (Computed from the Packet Inner Header(s)) and an Outcome of a RoundRobin/Load Balancing, Select a Slave VTI from a Plurality of Slave VTIs of a Bonded VTI and Select a Corresponding VPN Tunnel from a Plurality of VPN Tunnels

316 Put the Packet on an Output Port of the Selected Slave VTI

FIG. 3B

404 Generate a Hash from Outer L3/L4 Headers of a Packet to Select an Rx Queue.

406 Based on the Hash, Put the Packet into a Particular Rx Queue. A Particular CPU will Process the Packet in the Particular Rx Queue.

USING VTI TEAMING TO ACHIEVE LOAD BALANCE AND REDUNDANCY

BACKGROUND

Internet Protocol Security ("IPsec") is a protocol suite used to secure transmissions of communications packets. The IPsec virtual private networks ("VPNs") are widely used to protect the packets as they travel over the Internet between datacenters, between datacenters and branch offices, or between on-premises datacenters and public cloud datacenters. However, the designs of traditional IPsec processing that can only leverage a single core for a single IPsec tunnel are often unable to meet the increasing demands for the higher throughput and higher packet transmission rates.

An edge gateway may offer IPsec VPN services implemented in virtual routers. The IPsec services may be integrated with other services in the same software-defined network offering. Examples of other services may include packet routing, firewall, network address translation ("NAT"), load balancing, and service insertion.

The edges may support policy-based VPN and route-based VPN. The policy-based VPN relies on a policy defined by, for example, a system administrator. In the policy-based VPN, the VPN configuration may be changed only if the policy is changed. Thus, the policy-based VPN is difficult to dynamically modify and scale up. In contrast, the route-based VPN uses routing to decide which traffic needs to be protected and directed to a virtual tunnel interface ("VTI"). Since the route-based VPN supports dynamic routing protocols, it allows to dynamically modify the definitions of the protected traffic, and thus provides scalability.

VTI may be configured on a gateway and may be used to direct VPN traffic from the gateway to a VPN tunnel. The VTI, coupled with routing, can provide scalability and high availability of the VPN services. The VTI may rely on static routing and dynamically provided routing information to determine the traffic that should be protected and directed to the VPN tunnel.

The route-based VPN provides some benefits that are not provided by the policy-based VPN. For example, without reconfiguring the VPN, but based on dynamically updated Border Gateway Protocol ("BGP") configuration data, the route-based VPN can dynamically modify the definitions of the protected traffic. It also supports high availability via routing.

However, even the route-based VPN suffers from some performance issues. One of them is limited throughput. A packet sending gateway typically uses one VTI and one VPN tunnel to transmit the protected traffic. But, if the traffic directed to the VPN tunnel exceeds the tunnel capacity, then some packets are dropped as the tunnel's throughput is limited.

Other problems include CPU balancing issues. When a network interface card ("NIC") implemented on a receiving gateway receives an encapsulated packet, it determines a hash value from the packet's outer headers (such as L3-L4 headers) and uses the hash value to determine an Rx queue and select a CPU for the packet. However, since different flows carried through the same VPN tunnel have the same hash-based signature, a load balancer implemented on the receiving gateway keeps selecting the same CPU for all packets. Thus, the selected CPU may become overloaded, while other CPUs may remain under-utilized.

The route-based VPN also suffers from the lack of the VPN tunnel redundancy since a gateway uses only one VPN tunnel for all flows. If, for some reason, that VPN tunnel becomes nonoperational, then the VPN traffic cannot be communicated with a remote site.

SUMMARY

In an embodiment, an interface-teaming approach for achieving load balance and redundancy in the IPsec-based VPN is described. The approach is implemented using the functionalities of the Layer 3 ("L3") of the Open Systems Interconnection ("OSI") communications model. The approach includes implementing multiple VTIs in a gateway to increase throughput and provide redundancy and logically combining the multiple VTIs into a single teaming interface device.

From the perspective of the application layer ("L7" of the OSI), the gateway, for the VPN traffic, implements only a single teaming interface, called a teaming interface device. However, from the L3 perspective, the gateway implements multiple VTIs and multiple corresponding VPN tunnels. As long as at least one of the VPN tunnels is available to the teaming device, the teaming device may forward the VPN traffic to a remote gateway, and the upper-layer-protocol traffic may be communicated without interruptions. Thus, the approach increases throughput and provides redundancy in the VPN tunnels established between the gateways.

In an embodiment, the interface-teaming approach supports the route-based VPN which allows to dynamically update the VPN forwarding routes and provide scalability. More specifically, based on the BGP configuration data, two gateways establish a BGP-over-IPsec session between themselves, and then an IPsec VPN tunnel that corresponds to the BGP-over-IPsec session. As new and updated routes are reflected in the dynamically updated BGP configuration data provided by the BGP, the protected subnets are also updated, and the updated routing information is used to modify the BGP-over-IPsec session.

In an embodiment, an IPsec VPN tunnel is established between a teaming interface device implemented on one gateway of one datacenter and a teaming interface device implemented on another gateway of another datacenter. A teaming interface device is also referred to as a bonded VTI device, or a bonded VTI. A bonded VTI is a virtual device and has an assigned IP address according to the configuration data provided for the BGP-over-IPsec session.

A bonded VTI implemented in a gateway may include a plurality of slave VTIs configured on the gateway. While the bonded VTI is assigned an IP address, the corresponding slave VTIs do not have assigned IP addresses. One bonded VTI implemented on one gateway and another bonded VTI implemented on another gateway may be two endpoints of the IPsec VPN tunnel.

From the perspective of the application layer, the IPsec VPN traffic is transmitted between a bonded VTI implemented on one gateway and a bonded VTI implemented on another gateway. However, the VPN traffic is actually transmitted between slave VTIs of one bonded VTI of one gateway and slave VTIs of another bonded VTI of another gateway.

To facilitate transmission of IPsec VPN traffic from a bonded VTI implemented on a local gateway to a peer bonded VTI implemented on a remote gateway, a plurality of VPN tunnels is established between slave VTIs of the bonded VTI of the local gateway and peer slave VTIs of the peer bonded VTI of the remote gateway. A VPN tunnel, of the multiple VPN tunnels, is established between a local slave VTI of the bonded VTI configured on the local gateway and a peer slave VTI of the peer bonded VTI configured on the remote gateway.

To transmit a packet from a bonded VTI of a packet sending gateway to a packet receiving gateway, the bonded VTI of the packet sending gateway relays the packet onto a slave VTI that is selected from the multiple slave VTIs of the bonded VTI of the packet sending gateway.

A slave VTI may be selected based on a variety of approaches. For example, the slave VTI may be selected using a round-robin ("RR") approach, a load balancing approach, and/or a hash-based approach. If the hash-based approach is implemented, then a hash value is computed from the contents of inner headers of the packet. Since the hash values computed from the content of the inner headers are most likely different for different packet flows, the hash-based approach allows selecting different slave VTIs for different flows. This allows to load balance the VPN tunnels established between the slave VTIs of the packet sending gateway and the peer slave VTIs of the packet receiving gateway.

BRIEF DESCRIPTION OF THE DRAWINGS

In the drawings:

FIG. 3A is an example flow chart for configuring virtual private network tunnels.

FIG. 3B is an example flow chart for selecting, by a packet sending gateway, a virtual tunnel interface and selecting a virtual private network tunnel.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
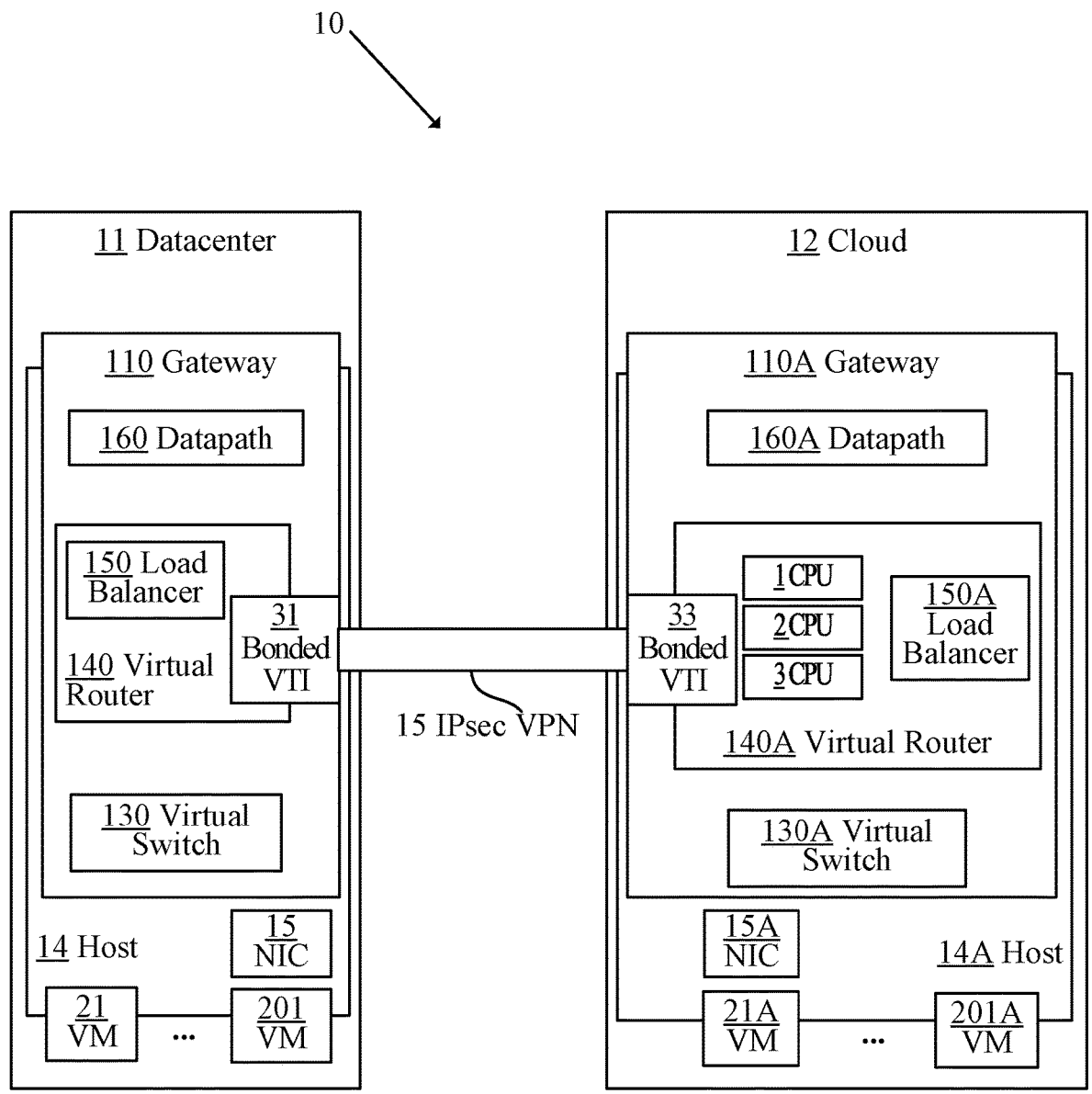
FIG. 1 is a block diagram depicting an example physical implementation view of an example logical network environment for realizing mechanisms for using virtual tunnel interface teaming to achieve load balance and redundancy.

FIG. 1 is a block diagram depicting an example physical implementation view of an example logical network environment for realizing mechanisms for using virtual tunnel interface teaming to achieve load balance and redundancy. In the depicted example, environment 10 includes a datacenter 11, a cloud environment 12, and an IPsec VPN tunnel 15. IPsec VPN tunnel 15 is established between a bonded VTI 31 of a gateway 110 of datacenter 11 and a bonded VTI 33 of a gateway 110A of cloud 12. Environment 10 also includes a physical network (not shown) and additional elements such as routers and switches, some of which are shown in FIG. 1.

In an embodiment, IPsec VPN tunnel 15 is used to transmit VPN traffic between gateways 110-110A.

Datacenter 11 may include one or more gateways 110 and one or more hosts 14. Gateway 110 may be configured to execute a datapath process 160, a load balancer process 150, a virtual router 140, and one or more virtual switches 130. Host 14 may support one or more virtual machines ("VMs") 21, 201. Gateway 110 may implement one or more CPUs (not shown).

Cloud 12 may include one or more gateways 110A and one or more hosts 14A. Gateway 110A may be configured to execute a datapath process 160A, a load balancer process 150A, a virtual router 140A, and one or more virtual switches 130A. Host 14A may support one or more VMs 21A, 201A. Cloud 12 may implement one or more CPUs 1-3.

Datapaths 160-160A may be implemented as network stacks that comprise collections of functional units configured to perform data processing operations and arithmetic operations on packets.

Load balancer processes 150-150A may be implemented in virtual devices configured in environment 10 to improve the distribution of workloads and network traffic across communications tunnels and multiple computing resources.

Hosts 14-14A are computer devices configured to implement VMs, such as VMs 21-201 and 21A-201A, gateways 110-110A, virtual routers 140-140A, virtual switches 130-130A, and the like. The hosts may be referred to as computing devices, host computers, host devices, physical servers, server systems, or physical machines. The hosts may include hardware components such as commodity hardware computing platforms including computing processors, memory units, physical network interface cards, and storage devices (not shown).

VMs 21-201 and 21A-201A are examples of virtualized computing instances or workloads. A virtualized computing instance may include an addressable data compute node or an isolated user space instance, often referred to as a name space container.

1.1. Gateways

Gateways 110-110A comprise software that may be installed in a virtual machine or on a physical server. Gateways 110-110A may be implemented as edge gateways and may be configured to provide network services such as dynamic host configuration protocol ("DHCP") services, firewall, NAT, static routing, VPN, and load balancing. Gateways 110-110A may provide network edge security and gateway services to VMs 21-201 and 21A-201A.

Gateways 110-110A may be installed either as distributed routers or as service gateways. Gateways 110-110A may be configured to connect isolated sub networks to shared networks. For example, gateways 110-100A may be configured to transmit IPsec VPN traffic from datacenter 11 to cloud 12 via IPsec VPN tunnel 15.

1.2. Virtual Tunnel Interfaces

Figure 2A:
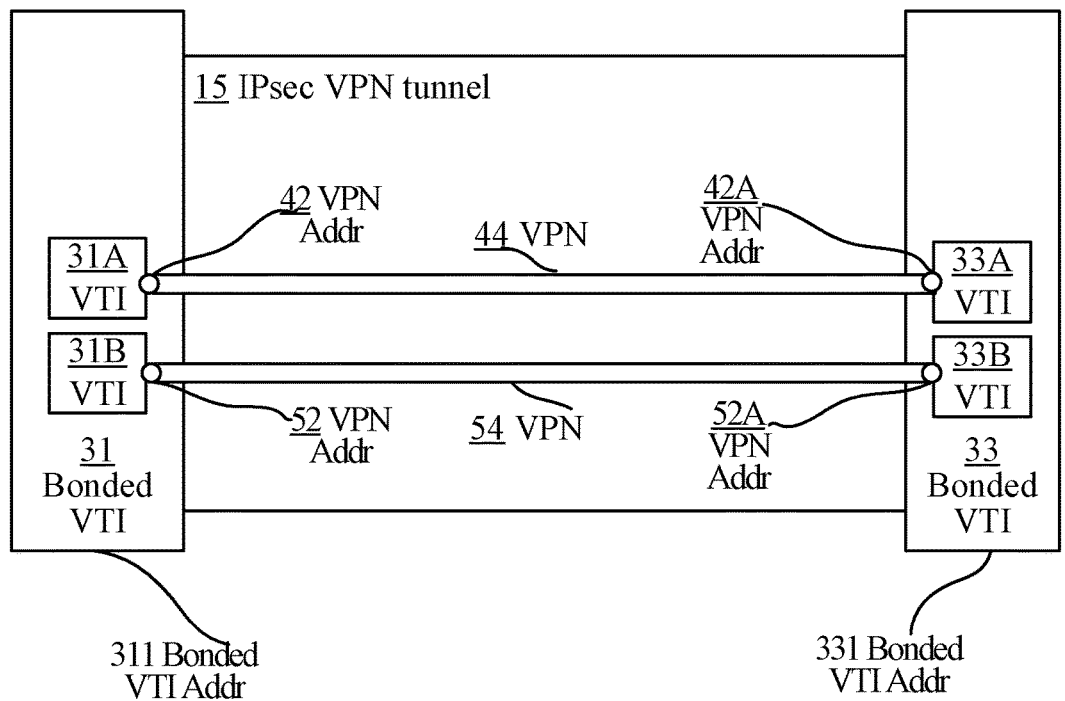
FIG. 2A is a block diagram depicting an example of multiple virtual private network tunnels established between two bonded devices.

FIG. 2A is a block diagram depicting an example of multiple VPN tunnels established between two bonded devices. In the depicted example, the multiple VPN tunnels comprise two VPN tunnels 44-54 that are logically combined into IPsec VPN tunnel 15 established between bonded VTI 31 configured on gateway 110 and bonded VTI 33 configured on gateway 110A. Bonded VTI 31 has a VTI address 311, while bonded VTI 33 has a VTI address 331. Bonded VTIs 31-33 also establish a BGP-over-IP session (not shown) that corresponds to IPsec VPN tunnel 15.

In an embodiment, bonded VTI 31 logically combines slave VTIs 31A-31B, while bonded VTI 33 logically combines slave VTIs 33A-333B.

VPN tunnel 44 has two endpoints: one endpoint is configured with an underlay VPN address 42 and another endpoint is configured with an underlay VPN address 42A. In FIG. 2A, VTI 31A has underlay VPN address 42, while VTI 33A has underlay VPN address 42A.

VPN tunnel 54 has two endpoints: one endpoint is configured with an underlay VPN address 52 and another endpoint is configured with an underlay VPN address 52A. In FIG. 2A, VTI 31B has underlay VPN address 52, while VTI 33B has underlay VPN address 52A.

Virtual switches 130-130A (shown in FIG. 1) relay VPN packets onto either bonded VTIs 31 or 33, respectively, and thus onto IPsec VPN tunnel 15. However, virtual routers 140-140A (shown in FIG. 1) relay VPN packets onto either slave VTIs 31A-31B or slave VTIs 33A-33B, respectively, and thus onto either VPN tunnel 44 or VPN tunnel 54.

As new and updated routes are reflected in the dynamically updated BGP configuration data provided by the BGP, the BGP-over-IPsec session, established between bonded VTIs 31-33, and addresses of the bonded VTIs are also updated.

1.3. VPN Tunnels

Once a BGP-over-IPsec session is created between bonded VTI 31 and bonded VTI 33, IPsec VPN tunnel 15 between bonded VTIs 31-33 is established, and a plurality of slave VPN tunnels 44-54 is established between slave VTIs 31A-33A and VTIs 31B-33B, respectively. In other implementations, additional VPN tunnels may be established between the VTIs.

From the perspective of the upper-layer-protocols, the IPsec VPN packets are routed via IPsec VPN tunnel 15 established between bonded VTI 31 and bonded VTI 33. However, using the presented VTI teaming approach, the packets are actually routed via slave VPN tunnels 44-54 between slave VTIs.

VPN tunnels 44 and 54 may be configured as active/active tunnels or as active/slave tunnels. If they are configured as active/active tunnels, then load balancers 150-150A select one of the active tunnels from VPN tunnels 44-54. The selection may be made based on an outcome of any selection algorithm. For example, the selection may be made based on a hash value computed from a 5-tuple (a source IP address, a destination IP address, a source port, a destination port, a protocol identifier) included in an inner IP header of the packet and based on an outcome of a RR/load balancing approach.

In an active/slave configuration, one VPN tunnel from a plurality of VPN tunnels 44-54 is active while the other VPN tunnel operates in a standby mode. If the active VPN tunnel becomes nonoperational, then the slave tunnel automatically becomes active. An active tunnel may be selected from the slave tunnels based on the RR algorithm, a hash algorithm, or any other load balancing algorithm.

2. Configuring VPN Tunnels

FIG. 3A is an example flow chart for configuring virtual private network tunnels. In step 302, based on configuration data obtained from, for example, a central control plane, a gateway configures a plurality of slave VTIs on the gateway, and configures a plurality of slave VPN tunnels that back up the slave VTIs. Each of the slave VPN tunnels is assigned two underlay VPN addresses. Referring to FIG. 2A., VPN tunnel 44 may have assigned underlay VPN address 42 at one endpoint and underlay VPN address 42A at another endpoint, while VPN tunnel 54 may have assigned underlay VPN address 52 at one endpoint and underlay VPN address 52A at another endpoint.

If a dynamic route-based VPN is implemented, then gateways 110-110A configure, in step 304, a BGP-over-IPsec session based on the BGP configuration data. The BGP configuration data may provide IP addresses for bonded VTIs 31 and 33. Based on the BGP configuration data, gateways 110-110A configure an IPsec VPN tunnel that corresponds to the BGP-over-IPsec session. Referring to FIG. 2A, IPsec VPN tunnel 15 may have assigned a local IP address 311 of bonded device VTI 31 and a peer IP address 331 of bonded VTI device 33.

3. Approaches for Selecting a Virtual Tunnel Interface

In an embodiment, datapath process 160 uses a VPN status function to indicate whether at least one slave VTI device implemented on gateway 110 is up and operational and to indicate whether a route to the slave VTI device exists. If one of a plurality of slave VPN tunnels fails but at least one other slave VPN tunnel remains operational, then the VPN traffic is redirected to the operational slave VPN tunnel. For the clarity of description, it is assumed herein that both VPN 44 and VPN 54 are operational.

In an embodiment, upon detecting a packet, a gateway selects a slave VTI from a plurality of slave VTIs of a bonded VTI implemented on the gateway. Once the gateway selects the slave VTI, the gateway relays the packet onto an output port of the selected slave VTI, and then onto a slave VPN tunnel that backs up the selected slave VTI.

Figure 2B:
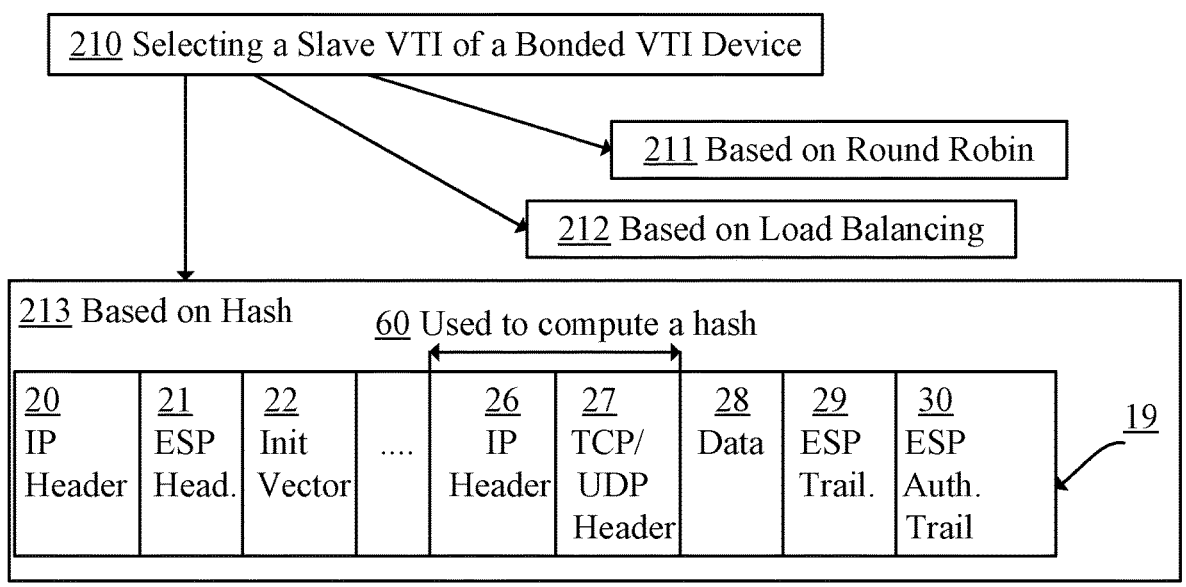
FIG. 2B is an example process for selecting a slave virtual tunnel interface of a bonded virtual tunnel interface device.

FIG. 2B is an example process for selecting a slave virtual tunnel interface of a bonded virtual tunnel interface device. To select (element 210) a slave VTI of a bonded VTI implemented in the gateway, the gateway may use various approaches, such as applying a RR approach (element 211) to the packet, applying a load balancing approach (element 212), or computing a hash value (element 213) from contents of inner headers of the packet.

In an embodiment, to compute (element 213) a hash value, the gateway uses contents of a portion 60 of packet 19. Portion 60 may include an inner IP header 26 and an inner TCP/UDP header 27. In addition to headers 26-27, packet 19 may include an outer IP header 20, an ESP header 21, an initialization vector 22, a data field 28, an ESP trailer 29, and ESP authorization trail 30.

4. Selecting a Virtual Tunnel Interface

FIG. 3B is an example flow chart for selecting, by a packet sending gateway, a virtual tunnel interface and selecting a VPN tunnel. If the gateway implements approach 213, described in FIG. 2B, then the gateway determines a hash value. In an embodiment, a hash value for a packet may be determined based on contents of inner headers of the packet. The hash values for different packet flows most likely will be different. Therefore, different slave VTIs most likely will be selected for different flows.

In step 314, the gateway performs a lookup of available slave VTIs configured on a bonded VTI implemented on the gateway. Referring to FIG. 2A, suppose that the available slave VTIs on gateway 110 include VTI 31A and VTI 31B.

Also, in this step, load balancer 150, or an equal-cost multi-path routing ("ECMP") process executed by virtual router 140, determines whether the packet needs to be relayed onto VT1 31A or VTI 31B. Virtual router 140 may make that determination based on the hash value computed from contents of inner headers 26-27, and using an outcome of an RR/load balancing.

Upon determining that the packet needs to be relayed onto, for example, VTI 31A, the gateway, in step 316, relays the packed on an output port of VTI 31A to have the packet transmitted via VPN tunnel 44 that backs up VTI 31A. However, if the gateway determines that the packet needs to be relayed onto VTI 31B, then the gateway relays the packet on an output port of VTI 31B to have the packet transmitted via VPN tunnel 54 that backs up VTI 31B.

In an embodiment, the approach circumvents a need for creating multiple BGP-over-IPsec sessions that otherwise would have to be created for each of the VPN tunnels established between slave VTIs of the peered gateways. Furthermore, the approach supports firewalls without worrying about asynchronous routing as all connection states are created on a single interface.

5. Selecting a CPU

In an embodiment, mechanisms are provided for allowing a network driver to spread incoming traffic across multiple CPUs to increase efficiency and processor cache utilization. The mechanisms may be implemented on a packet receiving side where the gateway selects a CPU from a plurality of CPUs implemented in the gateway. The CPUs may be selected based on, for example, a load balance approach to allow balancing the usage of the CPU resources on the packet receiving gateway.

Figure 4:
FIG. 4 is an example flow chart for selecting, by a packet receiving gateway, a CPU for an IPsec VPN packet.

FIG. 4 is an example flow chart for selecting, by a packet receiving gateway, a CPU for a VPN packet. In step 404, upon detecting a packet on VTI 33A (or VTI 33B), a NIC implemented in gateway 110A tries to identify an L4 header in the packet. The NIC also tries to identify in the packet an L3 header. If the NIC finds both L4-L3 headers, then a hash value is determined based on the contents of the L4-L3 headers. However, if the NIC identifies in the packet only the L3 header, then a hash value is determined based on the contents of L3 header.

In step 406, based on the hash value, a particular CPU implemented in gateway 110A is selected. For example, the particular CPU may be selected from a plurality of CPUs 1, 2 and 3, depicted in FIG. 1. Selecting a particular CPU, from a plurality of CPUs, allows a network driver to spread incoming traffic across multiple CPUs and thus increase the efficiency and processor cache utilization.

6. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

7. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for using virtual tunnel interface teaming to achieve load balance and redundancy in virtual private networks ("VPNs"), the method comprising:
   receiving, by a gateway, configuration data from a control plane;
   based on the configuration data, configuring on the gateway a bonded virtual tunnel interface ("bonded VTI") having a plurality of slave virtual tunnel interfaces ("slave VTIs");
   configuring a plurality of VPN tunnels between the plurality of slave VTIs configured on the gateway and a plurality of slave VTIs configured on a remote gateway;
   configuring an IPsec VPN tunnel between the bonded VTI configured on the gateway and a corresponding bonded VTI configured on the remote gateway;
   logically combining the plurality of VPN tunnels into the IPsec VPN tunnel; and
   enabling communications of IPsec VPN traffic via the IPsec VPN tunnel.

2. The computer-implemented method of claim 1, further comprising:
   based on the configuration data, configuring a Border Gateway Protocol ("BGP")-over-IPsec session between the bonded VTI configured on the gateway and a corresponding bonded VTI configured on the remote gateway; and
   wherein the BGP-over-IPsec session comprises a first IP address assigned to the bonded VTI configured on the gateway and a second IP address assigned to the bonded VTI configured on the remote gateway.

3. The computer-implemented method of claim 2,
   wherein the IPsec VPN tunnel corresponds to the BGP-over-IPsec session; and
   wherein the BGP-over-IPsec session is dynamically updated using the BGP.

4. The computer-implemented method of claim 3, further comprising:
   as the BGP-over-IPsec session is dynamically updated using updated routing information provided by the BGP, updating a configuration of the IPsec VPN tunnel using the updated routing information.

5. The computer-implemented method of claim 1, further comprising:
upon detecting a packet:
selecting a particular slave VTI, of the plurality slave VTIs configured on the gateway;
selecting a particular VPN tunnel, from the plurality of VPN tunnels, that backs up the particular slave VTI;
generating an encapsulated packet by encapsulating the packet at least with one or more headers comprising underlay IP addresses of the particular VPN tunnel; and
relaying the encapsulated packet onto an output port of the particular slave VTI to enable transmission of the encapsulated packet to the remote gateway.

6. The computer-implemented method of claim 5, wherein the particular slave VTI is selected for the packet based on any approach of: a round-robin approach, a load balancing approach, or a hash-value-based approach.

7. The computer-implemented method of claim 6, wherein upon receiving the encapsulated packet, the remote gateway selects a particular CPU, from a plurality of CPUs implemented in the remote gateway, for the encapsulated packet.

8. One or more non-transitory computer-readable storage media storing one or more computer instructions which, when executed by one or more processors, cause the one or more processors to perform:
receiving, by a gateway, configuration data from a control plane;
based on the configuration data, configuring on the gateway a bonded virtual tunnel interface ("bonded VTI") having a plurality of slave virtual tunnel interfaces ("slave VTIs");
configuring a plurality of VPN tunnels between the plurality of slave VTIs configured on the gateway and a plurality of slave VTIs configured on a remote gateway;
configuring an IPsec VPN tunnel between the bonded VTI configured on the gateway and a corresponding bonded VTI configured on the remote gateway;
logically combining the plurality of VPN tunnels into the IPsec VPN tunnel; and
enabling communications of IPsec VPN traffic via the IPsec VPN tunnel.

9. The one or more non-transitory computer-readable storage media of claim 8, storing additional instructions which, when executed by the one or more processors cause the one or more processors to perform:
based on the configuration data, configuring a Border Gateway Protocol ("BGP")-over-IPsec session between the bonded VTI configured on the gateway and a corresponding bonded VTI configured on the remote gateway; and
wherein the BGP-over-IPsec session comprises a first IP address assigned to the bonded VTI configured on the gateway and a second IP address assigned to the bonded VTI configured on the remote gateway.

10. The one or more non-transitory computer-readable storage media of claim 9, wherein the IPsec VPN tunnel corresponds to the BGP-over-IPsec session; and
wherein the BGP-over-IPsec session is dynamically updated using the BGP.

11. The one or more non-transitory computer-readable storage media of claim 10, storing additional instructions which, when executed by the one or more processors cause the one or more processors to perform:
as the BGP-over-IPsec session is dynamically updated using updated routing information provided by the BGP, updating a configuration of the IPsec VPN tunnel using the updated routing information.

12. The one or more non-transitory computer-readable storage media of claim 8, storing additional instructions which, when executed by the one or more processors cause the one or more processors to perform:
upon detecting a packet:
selecting a particular slave VTI, of the plurality slave VTIs configured on the gateway;
selecting a particular VPN tunnel, from the plurality of VPN tunnels, that backs up the particular slave VTI;
generating an encapsulated packet by encapsulating the packet at least with one or more headers comprising underlay IP addresses of the particular VPN tunnel; and
relaying the encapsulated packet onto an output port of the particular slave VTI to enable transmission of the encapsulated packet to the remote gateway.

13. The one or more non-transitory computer-readable storage media of claim 12, wherein the particular slave VTI is selected for the packet based on any approach of: a round-robin approach, a load balancing approach, or a hash-value-based approach.

14. The one or more non-transitory computer-readable storage media of claim 13, wherein upon receiving the encapsulated packet, the remote gateway selects a particular CPU, from a plurality of CPUs implemented in the remote gateway, for the encapsulated packet.

15. An edge service gateway implemented in a computer network and configured to implement virtual tunnel interface teaming approach to achieve load balance and redundancy in virtual private networks ("VPNs"), the edge service gateway comprising:
one or more processors;
one or more memory units; and
one or more non-transitory computer-readable storage media storing one or more computer instructions which, when executed by the one or more processors, cause the one or more processors to perform:
receiving, by a gateway, configuration data from a control plane;
based on the configuration data, configuring on the gateway a bonded virtual tunnel interface ("bonded VTI") having a plurality of slave virtual tunnel interfaces ("slave VTIs");
configuring a plurality of VPN tunnels between the plurality of slave VTIs configured on the gateway and a plurality of slave VTIs configured on a remote gateway;
configuring an IPsec VPN tunnel between the bonded VTI configured on the gateway and a corresponding bonded VTI configured on the remote gateway;
logically combining the plurality of VPN tunnels into the IPsec VPN tunnel; and
enabling communications of IPsec VPN traffic via the IPsec VPN tunnel.

16. The edge service gateway of claim 15, storing additional instructions which, when executed by the one or more processors, cause the one or more processors to perform:
based on the configuration data, configuring a Border Gateway Protocol ("BGP")-over-IPsec session between the bonded VTI configured on the gateway and a corresponding bonded VTI configured on the remote gateway; and
wherein the BGP-over-IPsec session comprises a first IP address assigned to the bonded VTI configured on the gateway and a second IP address assigned to the bonded VTI configured on the remote gateway.

17. The edge service gateway of claim 16, wherein the IPsec VPN tunnel corresponds to the BGP-over-IPsec session; and wherein the BGP-over-IPsec session is dynamically updated using the BGP.

18. The edge service gateway of claim 17, storing additional instructions which, when executed by the one or more processors, cause the one or more processors to perform:

as the BGP-over-IPsec session is dynamically updated using updated routing information provided by the BGP, updating a configuration of the IPsec VPN tunnel using the updated routing information.

19. The edge service gateway of claim 15, storing additional instructions which, when executed by the one or more processors, cause the one or more processors to perform:

upon detecting a packet:
selecting a particular slave VTI, of the plurality slave VTIs configured on the gateway;
selecting a particular VPN tunnel, from the plurality of VPN tunnels, that backs up the particular slave VTI;
generating an encapsulated packet by encapsulating the packet at least with one or more headers comprising underlay IP addresses of the particular VPN tunnel; and
relaying the encapsulated packet onto an output port of the particular slave VTI to enable transmission of the encapsulated packet to the remote gateway.

20. The edge service gateway of claim 19, wherein the particular slave VTI is selected for the packet based on any approach of: a round-robin approach, a load balancing approach, or a hash-value-based approach.

* * * * *